Dec. 7, 1965   M. V. DE JEAN ETAL   3,222,234
METHOD FOR BONDING PARTS OF AN ELECTRICAL MOTOR
Filed Dec. 26, 1962   2 Sheets-Sheet 1
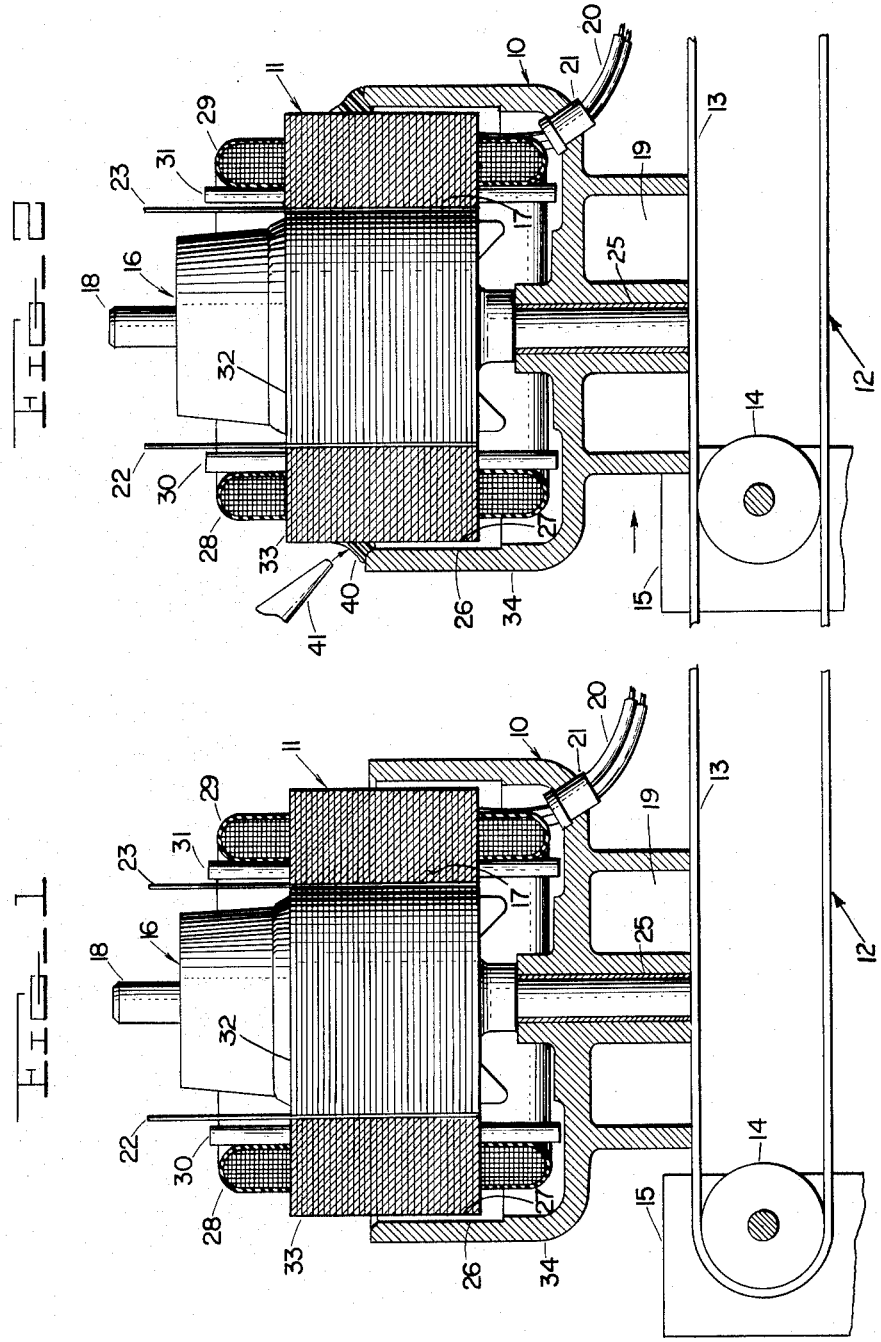
INVENTORS:
Milton V. DeJean,
Michael J. Lacy,
by Henry J. Morinich
Attorney.

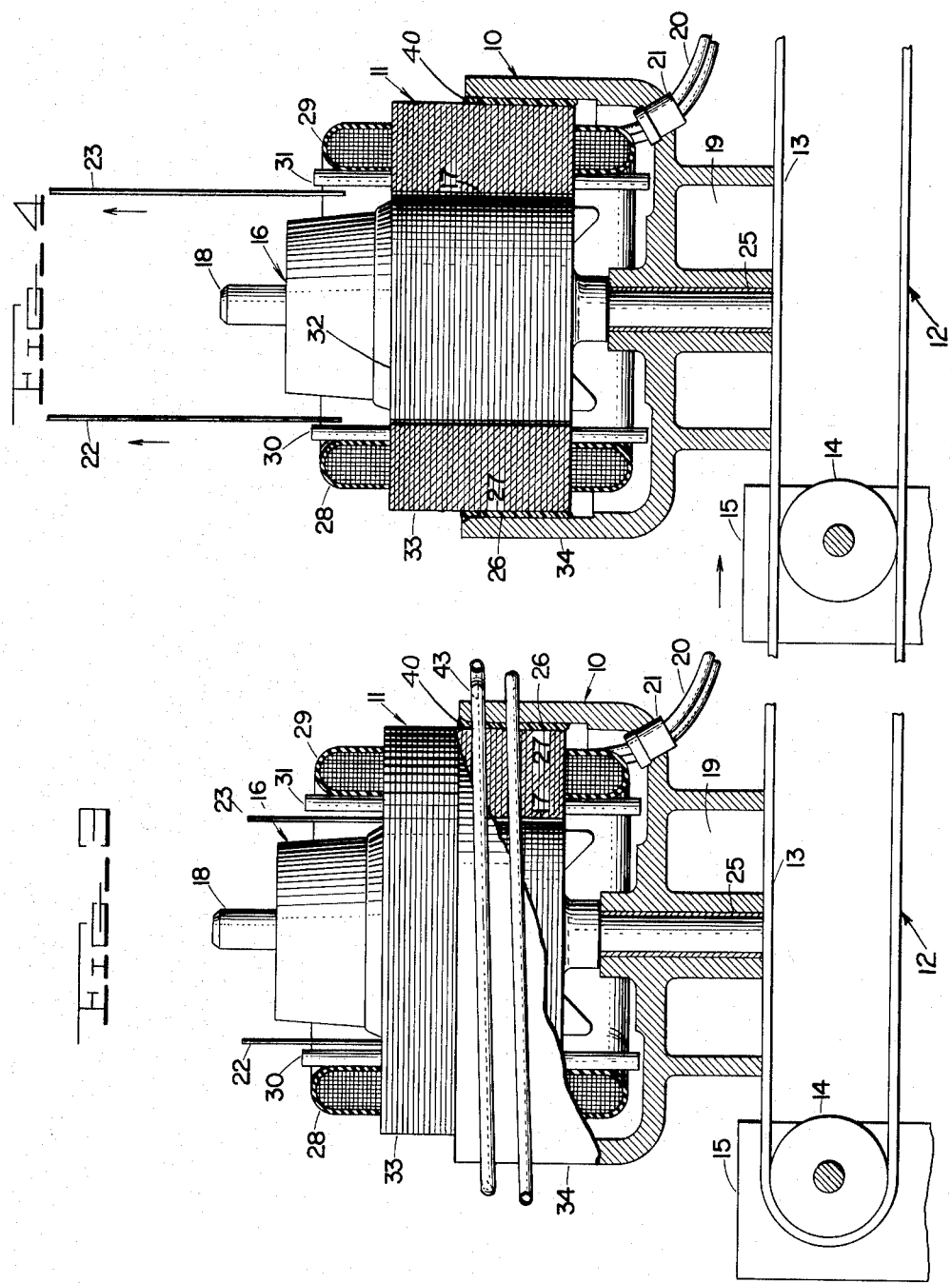

United States Patent Office 3,222,234
Patented Dec. 7, 1965

3,222,234
METHOD FOR BONDING PARTS OF AN ELECTRICAL MOTOR
Milton V. De Jean and Michael J. Lacy, Fort Wayne, Ind., assignors to General Electric Company, a corporation of New York
Filed Dec. 26, 1962, Ser. No. 246,955
2 Claims. (Cl. 156—60)

This invention relates to an electrical motor and more particularly to an improved method for bonding parts of an electrical motor, such as end shield, stators and frame members.

In order to produce small fractional horsepower motors on a mass production basis at relatively low cost, it is particularly desirable that the time required to assemble various parts of the motor be kept at a minimum. Further, in applications where the stator and the end shield are bonded to form an integral unit, it is necessary that the alignment of the end shield with respect to the stator be maintained. A misalignment of the end shield may change the radial gap between the rotor and stator, and may thereby affect the electrical performance of the motor. It is necesary, therefore, that such parts be assembled without creating undesirable stresses that might cause a misalignment of the parts joined. Means for securing parts in assembled relation, such as by bolting, welding or shrink-fitting may cause the parts joined to be unduly stressed and are not readily adaptable to automated type of assembly techniques.

Thermosetting resins, such as the epoxy resins, are particularly suitable materials for use as an adhesive to bond parts of an electrical motor since the material not only serves as an adhesive but may also be used to provide secondary insulation between the parts to be joined in assembled relation. It will be appreciated that when a part, such as an end shield of a small fractional horsepower motor, is assembled on the stator, the insulating materials used, such as for example, the rubber insulation on the leads that are brought out through the end shield, impose a limitation on the type and amount of heating that can be carried out to effect a cure of the thermosetting resin adhesive. The motor must not, of course, be exposed to a heating cycle that will cause a degradation of the electrical insulation.

Conventionally, thermosetting resins have been applied to surfaces to be bonded by techniques, such as brushing or spraying. Such techniques have not been entirely satisfactory in practice since they are not readily adaptable to automated manufacturing operations and, frequently the surfaces to be bonded by the resin are not effectively wetted by the resin. Also, the relatively short pot life of the thermosetting resins have presented problems in practice.

There is a need, therefore, for an improved method of bonding parts of a motor with a thermosetting resin wherein the resin adhesive can be made to effectively wet the surfaces to be bonded and can be easily applied to the surfaces. It is also desirable that the method be readily adaptable to automated type of manufacturing operations. Preferably, the time required to complete the bonding of the parts should be of relatively short duration, and the resin should be readily applied by applicators such as nozzles, that are adaptable to automated application techniques.

Accordingly, an object of the invention is to provide an improved method for bonding parts of an electrical motor with thermosetting resin adhesives.

Another object of the present invention is to provide an improved method for bonding parts of an electric motor wherein automated or semiautomated means can be used to carry out the bonding operation.

It is a more specific object of the present invention to provide an improved method for bonding an end shield in assembled relation with a stator of an electrical motor with a thermosetting resin adhesive.

In accordance with one form of the invention an improved method is provided for joining the parts of an electric motor in assembled relation. The parts to be assembled are initially positioned in preassembled and overlapping relation to provide a predetermined alignment and capillary pacing between the surfaces to be joined. An uncured theromsetting resin, having an epoxide equivalent in the range between 175 and 350, is applied at an edge of the surfaces to be joined. Heat is then applied to cause the thermosetting resin adhesive to reach its gelation state preferably within five minutes. The rapid heating of the thermosetting resin adhesive causes the viscosity of the resin to be lowered before the onset of gelation thereby causing substantially all of the resin to be drawn into the capillary spacing by capillary action between the surfaces and to effectively wet the surfaces to be joined. The predetermined capillary spacing between the surfaces is of sufficient size to cause the liquid resin to be retained between the surfaces to be joined until gelation occurs. The thermosetting resin adhesive may then be cured to an infusible state by allowing the assembly of parts to cool to room temperature or by additional heating, if desired.

Preferably, the thermosetting resin used in the practice of the invention was a complex epoxy resin containing epoxide groups and comprising the polyether derivative of a polyhydric organic compound selected from the class consisting of polyhydric alcohols having adjacent hydroxyl groups. The resin adhesive includes a suitable amine curing agent, such as a modified polyamine, to provide the desired catalytic action required to cure the resin in a relatively short interval.

In a preferred form of the invention we have provided an improved method for joining an end shield assembly and a stator member of an electric motor. Initially, the end shield assembly and the stator member are positioned in preassembled relation to provide a predetermined spacing between the interfacial surfaces to be joined. The thermosetting resin adhesive is applied at the upper edge of the surfaces to be joined. Portions of the end shield assembly and the stator member in the region of the surfaces to be joined are heated by induced eddy currents to provide a localized heating so that the thermosetting resin adhesive reaches its gelation state in not more than five minutes. The heating of the resin causes the viscosity of the resin to be immediately lowered. Before the onset of gelation, the fluid resin flows between and wets the surfaces to be joined, the predetermined spacing causing the fluid resin to be retained between the surfaces to be joined without spillage. Additional curing of the resin can be effected by allowing the heated parts to cool to room temperature, the heat absorbed by the parts during the heating step promoting the cure of the thermosetting resin adhesive.

The subject matter which I regard as my invention is set forth in the appended claims. The invention itself, however together with further objects and advantages thereof may be understood by referring to the following description taken in conjunction with the accompanying drawings in which:

FIGURE 1 is a view partly in section of an end shield assembly and a stator member vertically positioned on a conveyor in preassembled relation by means of shims to illustrate a step in one form of the invention;

FIGURE 2 is a view partly in section of the end shield and stator shown in FIGURE 1 and illustrating the step involving the application of the resin adhesive;

FIGURE 3 is a view corresponding to the view shown in FIGURE 2 showing the heating step in accordance with the preferred form of the invention; and FIGURE 4 is a similar view to that shown in FIGURE 3, illustrating the assembly after the heating coil has been removed, the cure of the resin adhesive being effected by allowing the assembly to cool at room temperature.

Referring now in more detail to the drawings, I have shown therein an end shield assembly 10 and a stator member 11 in various stages of assembly on a conveyor means 12 which includes a conveyor belt 13 carried on the rollers 14 supported by the frame member 15.

As shown, a rotor member 16 is arranged coaxially within a stator bore 17 so as to define an annular air gap and is secured to a shaft 18 by a suitable means (not shown). The end shield assembly 10 is formed with a cavity 19 for retaining a felt or other lubricant storing means. Rubber insulated leads 20 are brought out through the end shield assembly 10 for connecting the motor to a power supply. A rubber grommet 21 protects the insulation of the leads 20 from chafing against the end shield assembly 10 when the leads 20 are handled.

In order for the rotor member 16 to be held in the proper radial position with respect to the stator member 11, suitable shims 22, 23 are inserted between the rotor member 16 and stator member 11. The shims 22, 23 are removed after the end shield assembly 10 is sufficiently bonded or joined to the stator member 11 to permit their removal without displacing the stator member 11. Although metal gage strips were used as shims 22, 23 in the illustrated embodiment of the invention, it will be appreciated that any suitable means for positioning the rotor member 16 within the stator member 11 may be employed. It will be noted that in the illustrated embodiment of the invention, the stator member 11 was positioned in preassembled relation with the end shield assembly 10 by placing the shaft 18 in the bearing 25. In this way a predetermined spacing or gap was provided between the interfacial surfaces 26, 27 which are to be joined.

It will be seen that the rotor member 16 includes the field exciting windings 28, 29 and the winding pins 30, 31. The rotor member 16 has a core 32 formed of laminated magnetic material. The stator member 11 includes a stator core 33 formed of a stack of thin steel laminations. In the illustrated embodiment of this invention the end shield frame 34 was constructed of cast iron. It will be seen that the cast iron end shield frame 34 was bonded directly to the laminated stator core 33. Although in the exemplification of the invention the end shield assembly 10 was intended for use in a unit-bearing type of motor construction, it will be appreciated that the improved method can be used with other types of motor constructions.

In accordance with the invention as exemplified in the illustrated embodiment, the end shield assembly 10, the stator and rotor members 11, 16 are initially positioned in preassembled relation so that the air gap between the stator member 11 and the rotor member 16 is maintained.

The stator member 11, which is to be joined to the end shield frame 34, is initially positioned in preassembled relation so that the interfacial surfaces 26, 27 to be joined are disposed to provide a predetermined spacing or gap between the surfaces 26, 27. In the unit type of motor used in the illustrated embodiment of the invention, the gap was obtained when the shaft 18 of the preassembled stator and rotor members 11, 16 was placed within the bearing 25 carried by the end shield assembly 10. The radial dimension of the gap required for the particular resin adhesive used must be sufficient to retain the resin adhesive without spillage until the resin adhesive reaches its gelation state. For the motor and the epoxy resin adhesive used in the exemplification of the invention, a gap of approximately 0.020 of an inch was found by trial and error to be sufficient to cause the fluid resin adhesive to be retained between the surfaces 26, 27 to be bonded.

At the station shown in FIGURE 2, a resin adhesive 40 is shown being applied at an edge of the interfacial surfaces 26, 27 to be joined. In the illustrative embodiment of the invention, the resin adhesive 40 was applied by a nozzle 41 as a continuous bead around the opening between the end shield frame 34 and the stator core 33. As will be seen in FIGURE 2, the resin adhesive used in the exemplification of the invention when applied did not flow into the gap between the interfacial surfaces 26, 27 to any appreciable extent. Further, a sufficient amount of resin adhesive 40 was applied so that substantially the entire space between the interfacial surfaces 26, 27 was filled when the resin adhesive 40 was caused to flow between the surfaces 26, 27 as the viscosity of the resin adhesive 40 was lowered by heating the assembly. In the exemplification of the invention the resin adhesive 40 when cured provided secondary insulation between the end shield assembly 10 and the stator member 11. It will be apparent to those skilled in the art that the resin adhesive 40 can be applied in spots at the edges 26, 27, if secondary insulation and continuous coverage over the surfaces 26, 27 to be joined are not desired.

The resins which may be used as adhesives should have good wettability, low shrinkage, good adhesive properties, low water absorption, high dielectric strength, good flexibility and a high mechanical strength. Also, the resin adhesives must be compatible with the other materials used in the construction of the motor. Where, as in the exemplification of the invention, a part to be bonded with the resin adhesive includes rubber insulated leads 20, the temperature at which the cure of the resin can be effected is limited, since the leads 20 of the motor must not, of course, be subjected to a heating cycle that will cause a degradation of the rubber insulation.

Preferably, a thermosetting resin, variously known as an epoxy, ethoxyline or epoxide resin, may be used in the practice of the invention. The resins may be obtained by reacting an epihalogenohydrin, for instance, epichlorohydrin, and a phenol having at least two phenolic hydroxy groups, for example, bis-(4-hydroxyphenyl) - dimethylmethane. These resins are more fully described in U.S. Patent No. 2,324,483—Castan, U.S. Patent No. 2,444,333—Castan, and British Patents 518,057 and 579,698. It will be noted that the epoxy resins used contain more than one ethylene oxide group, e.g., from 1 to 2 or more groups per molecule and may be prepared by effecting reaction between a polyhydroxy phenol or alcohol, for example, hydroquinone, resorcinol, glycerine, or condensation products of phenols with ketones, for instance, bis-(4-di-hydroxydiphenyl)-2,2-propane, with epichlorohydrin. The epoxy resins used in the invention contain expoxide groups or epoxide and hydroxyl groups as their functional groups and are generally free from other functional groups such as basic and acidic groups. These epoxide groups are structurally located on the end of the polyether chain. The degree of polymerization of the resin is generally expressed in terms of epoxide equivalents. The term "epoxide equivalent" is defined as the weight of the resin in grams containing one gram equivalent weight of the epoxide group.

The epoxy resin used in the exemplification of the invention had an epoxide equivalent between 180 and 195 and is commercially known as Epon 828 manufactured by the Shell Chemical Corporation. The resin adhesive used had the following composition, the percentages being by weight:

| | Percent |
|---|---|
| Epoxy resin | 72 |
| Ethylene oxide adduct of diethylene-triamine and bisphenol A | 18 |
| Silica filler | 10 |

The resins which can be used in the practice of the invention are not necessarily limited to the epoxy resins. Other thermosetting resins, such as the polyamide resins, may be used. Inert fillers may be added to the adhesive to control its viscosity, to reduce the overall cost of the adhesive and to improve its thermal conductivity, coefficient of expansion and shrinkage characteristics. It will be appreciated that other inert fillers other than silica such as for example calcium sulfate, aluminum oxide, mica may be used.

A modified polyamine was employed as a curing agent since a polyamine-epoxy system requires a relatively short time and temperature treatment. Other amine curing agents which may be used are, for example, ethylene diamine, diethylenetriamine, triethylenetetramine, tetraethylenepentamine, diethylaminopropyl amine, n-aminoethylpiperazine, menthane diamine, m-phenylenediamine, p,p' - diaminodiphenylsulfome, 4,4' - methylenedianiline, boron trifluoride monoethylamine, dicyandiamide, and 2,4,6-tris-dimethylaminomethylphenol.

In order to cause the resin adhesive 40 to flow and wet the interfacial surfaces 26, 27 to be bonded, the assembly was heated within an induction heating coil 43 as shown in FIGURE 3. In the exemplification of the invention, the induction heating was carried out at a frequency of 500,000 cycles per second. A manually controlled 15 kilowatt induction heater (not shown) was used to energize the coil 43.

For the purpose of determining the proper curing cycle for the motor used in the exemplification of the invention, a thermocouple was placed between the end shield frame 34 and the stator core 33 in a location approximately under the induction heating coil 43. It was found that by adjusting the current in the induction heating coil 43 to 130 amperes, the temperature in the joint, as indicated by the thermocouple, increased from 23 degrees centigrade to 200 degrees centigrade in approximately 16 seconds. The induced eddy currents heated the portions in the region of the joint to cause the resin to reach its gelation state in less than one minute. Prior to the onset of gelation the viscosity of the resin adhesive 40 was lowered so that the adhesive flowed between the interfacial surfaces thereby wetting them. The current to the coil 43 was turned off when the thermocouple indicated a temperature of 200 degrees centigrade.

The temperature of 200 degrees centigrade was selected as a cut-off point to determine the time interval for the heating step. It will be appreciated that other temperatures may be used depending on such factors as the ambient temperature, the volume of the parts to be joined, the bulk to surface area ratio and the resin-catalyst system used.

The gelation state, as the term is used herein, denotes the point at which the resin undergoes a sudden increase in viscosity. The gelation state of the resin-catalyst system should be achieved within five minutes, preferably within one minute, so that the bonding operation can be accomplished in a relatively short residence time. The end shield assembly 10 and the stator member 11 must not, of course, be heated to a point where degradation of components, such as the rubber insulated leads, may occur.

It will be understood that the purpose of the heating step is to equilibrate the joint at a desired temperature level to cause the resin adhesive to reach its peak exotherm temperature in a relatively short period of time. Thus, sufficient heat must be supplied so that the resin adhesive receives its required energy of activation. Since the opening of a strained epoxide group is exothermic, the curing reaction proceeds rapidly once it has been activated.

An important advantage of the invention is that the resin adhesive is drawn between the interfacial surfaces to be bonded by what is believed to be essentially capillary forces. It was found that the resin adhesive could be drawn between the interfacial surfaces when the parts to be bonded were inverted, the resin adhesive having been applied at a lower edge of the surfaces.

After the heating cycle was completed, the end shield assembly 10 and stator member 11 were allowed to cool to room temperature. The heat absorbed by these parts was sufficient to carry the cross-linking of the resin adhesive well beyond the gelation point. Thus, the curing step in the exemplification of the invention was preferably carried out by allowing the bonded parts to cool to room temperature. After the unit had cooled, the parts were sufficiently bonded so that the shims 22, 23 could be removed to free the rotor member 16 without displacing the relative position of the stator member 11 with respect to the stator assembly 10.

In order to determine the mechanical strength properties of an end shield assembly 10 bonded to a stator member 11, a number of such parts were bonded with an epoxy resin adhesive in accordance with the method of the invention. The parts to be joined were not cleaned or degreased. The resin adhesive was applied as shown in FIGURE 2. The units were heated by a 15 kilowatt induction heater. Temperature readings were made with a thermocouple inserted in the joint. The high frequency heat was applied for an interval sufficient to bring the joint up to a temperature of 200 degrees centigrade as indicated by the thermocouple. The assemblies were then allowed to cool slowly to the ambient temperature and were aged at room temperature for a period of twenty four hours before testing.

In Table I below the tensile force required to break the joint is set forth. Sample assemblies Numbers 1 and 4, as identified in Table I were tested at a temperature of ninety degrees centigrade. The tensile tests of sample assemblies 2 and 3 were carried out at room temperature.

Table I

| Sample Assembly Number | Heating Time Seconds | Test Temperature (degrees, centigrade) | Tensile Strength (pounds) |
| --- | --- | --- | --- |
| 1 | 22 | 90 | 505 |
| 2 | 25 | Room Temperature | 900 |
| 3 | 15 | 90 | 550 |
| 4 | 16 | Room Temperature | 850 |

The variation in the times required to heat the joint to a temperature of 200 degrees centigrade was believed to be due to the nonuniform thickness of the end shields. Although the tensile strength as shown in Table I was satisfactory, it will be appreciated that if a higher tensile strength is desired, the parts to be bonded may be cleaned and degreased.

From the foregoing description of a preferred exemplification of the invention, it will be apparent that an improved method for bonding parts of an electrical motor has been provided that requires a relatively short residence time. The resin adhesive effectively wets the surfaces to be joined by a capillary type of action. An important advantage of the present invention is that the resin adhesive not only serves to bond the stator and the end shield but may completely fill the space between the stator and end shield to provide secondary insulation therebetween. Further, it will be apparent that the method is readily adaptable to automated assembly techniques since the resin adhesive does not have to be applied manually.

While the present invention has been described with reference to particular embodiments and examples, it will be understood that modifications and substitutions may be made therein as will be apparent to those skilled in the art. It is, therefore, intended by the appended claims to cover all such modifications that fall within the true spirit and scope of the invention.

What we claim as new and desire to secure by Letters Patent of the United States is:

1. A method of joining metallic parts of an electric motor in assembled relation, said method comprising the steps of: positioning the metallic parts in fixed preassembled and overlapping relation to form a predetermined alignment and capillary spacing between the interfacial surfaces to be joined; applying an uncured thermosetting resin adhesive at an edge of the capillary spacing of said interfacial surfaces to be joined, with said resin adhesive having an epoxide equivalent in the range from 175 to 350; heating said uncured thermosetting resin adhesive to a predetermined temperature to cause the resin to reach its gelation state; said heating of the thermosetting resin adhesive causing its viscosity to be lowered, with substantially all of said thermosetting resin adhesive being drawn into the capillary spacing between the aligned interfacial surfaces to be joined by capillary action to wet these surfaces before the gelation state is reached, and with the capillary spacing being of sufficient size that said thermo-setting resin adhesive is retained therein between said interfacial surfaces by capillary action without spillage until gelation occurs; and curing said thermosetting resin adhesive to a solid infusible state thereby joining said metallic parts together.

2. The method of claim 1 in which the uncured thermosetting resin adhesive is heated to the gelation state within five minutes by inducing currents in the portions of the metallic parts to be joined near said interfacial surfaces.

References Cited by the Examiner
UNITED STATES PATENTS

| | | |
|---|---|---|
| 2,909,740 | 10/1959 | Seidel et al. |
| 2,970,775 | 2/1961 | Chapman. |
| 3,002,261 | 10/1961 | Avila et al. _____ 29—155 |
| 3,010,045 | 11/1961 | Plagge et al. |
| 3,075,870 | 1/1963 | Hedler et al. |

ALEXANDER WYMAN, *Primary Examiner.*

JACOB STEINBERG, *Examiner.*